US012600296B1

(12) United States Patent
Garza Villarreal et al.

(10) Patent No.: US 12,600,296 B1
(45) Date of Patent: Apr. 14, 2026

(54) VEHICLE INTERIOR LIGHTING ASSEMBLY WITH VARIED TRANSPARENCY

(71) Applicant: FCA US LLC, Auburn Hills, MI (US)

(72) Inventors: Fernando Marco Garza Villarreal, Windsor (CA); Matthew R Kappel, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 19/041,028

(22) Filed: Jan. 30, 2025

(51) Int. Cl.
| | |
|---|---|
| *B60Q 3/51* | (2017.01) |
| *B60Q 3/54* | (2017.01) |
| *B60Q 3/60* | (2017.01) |
| *B60Q 3/74* | (2017.01) |

(52) U.S. Cl.
CPC .................. *B60Q 3/51* (2017.02); *B60Q 3/54* (2017.02); *B60Q 3/60* (2017.02); *B60Q 3/74* (2017.02)

(58) Field of Classification Search
CPC ... B60Q 3/51; B60Q 3/54; B60Q 3/60; B60Q 3/74; B60Q 3/208

USPC .......................................................... 362/503
See application file for complete search history.

(56) References Cited

U.S. PATENT DOCUMENTS

| | | | | |
|---|---|---|---|---|
| 4,733,335 | A * | 3/1988 | Serizawa ................ | F21V 29/83 362/547 |
| 2014/0211498 | A1 * | 7/2014 | Cannon .................. | B60Q 3/217 362/555 |
| 2018/0022270 | A1 * | 1/2018 | Matsuoka ............ | B60Q 1/2696 362/460 |
| 2020/0276891 | A1 * | 9/2020 | van Doleweerd .......................... | B32B 17/10541 |
| 2023/0398930 | A1 * | 12/2023 | Dunkel .................... | B60Q 3/74 |

* cited by examiner

*Primary Examiner* — Thomas M Sember
(74) *Attorney, Agent, or Firm* — Jeremy J. Klobucar

(57) ABSTRACT

An interior lighting assembly for a vehicle includes a base having an end wall and an open side opposite to the end wall, a light emitter between the end wall and the open side; and a cover attached to the base over the open side and defining with the base an interior in which the emitter is received, the cover has a first portion formed of a first material and a second portion formed of a second material so that the second portion has a lesser transparency than the first portion.

20 Claims, 3 Drawing Sheets

VEHICLE INTERIOR LIGHTING ASSEMBLY WITH VARIED TRANSPARENCY

FIELD

The present disclosure relates to an interior lighting assembly having a cover with varied transparency.

BACKGROUND

Vehicles include interior lights that project light into a passenger compartment of the vehicle. The projected light is often directed onto glass surfaces, like windows and a windshield of the vehicle which causes undesirable glare and reflections that are very noticeable to passengers, particularly at night or in other lower ambient light conditions. Additionally, light projections or reflections may be directed at or toward passengers which can be undesirable.

SUMMARY

In at least some implementations, an interior lighting assembly for a vehicle includes a base having an end wall and an open side opposite to the end wall, a light emitter between the end wall and the open side; and a cover attached to the base over the open side and defining with the base an interior in which the emitter is received, the cover has a first portion formed of a first material and a second portion formed of a second material so that the second portion has a lesser transparency than the first portion.

In at least some implementations, the second portion is opaque and light from the emitter is emitted from the assembly only through the first portion.

In at least some implementations, the first portion is bonded to the second portion along a seam that overlaps the light emitter so that light is emitted by the emitter onto at least part of the second portion, the seam and at least part of the first portion.

In at least some implementations, one of the first portion and the second portion is molded onto the other of the first portion and the second portion so that the first portion and second portion are integrally connected together.

In at least some implementations, the emitter is or is part of a LED light tube. In at least some implementations, the emitter includes an LED.

In at least some implementations, a reflector spaced from the cover is arranged to reflect light emitted from the emitter and through the first portion of the cover. In at least some implementations, the reflector includes a first surface and a second surface at a different angle than the first surface, and wherein the first surface is located between the emitter and the second surface in a light path. In at least some implementations, an included angle between the first surface and the second surface is between 45 degrees and 135 degrees.

In at least some implementations, a vehicle includes a first trim piece having an exterior surface that defines a first trim piece show surface defining part of a cavity that defines at least part of a light path, a second trim piece spaced from the first trim piece and including a second trim piece show surface that defines part of the light path, and a lighting assembly received within the cavity and overlapped by a surface of the first trim piece that is not the first trim piece show surface and that defines part of the cavity. The lighting assembly has a base, a cover and an emitter that is received between the base and the cover. The cover has a first portion formed of a first material and a second portion formed of a second material so that the second portion has a lesser transparency than the first portion. The second trim piece show surface is arranged to direct light emitted from the emitter and through the first portion of the cover out of the light path, and the second trim piece show surface is arranged to direct light away from a glass surface of the vehicle.

In at least some implementations, the second portion of the cover blocks light emitted by the emitter that would be reflected by the second trim piece show surface toward the glass surface.

In at least some implementations, a reflecting surface is not parallel to the second trim piece show surface, and the reflecting surface is downstream of the second trim piece show surface and arranged to reflect light onto the first trim piece show surface.

In at least some implementations, the reflecting surface is arranged at a height above the second trim piece show surface and the reflecting surface is arranged to reflect light down onto the first trim piece show surface, where above and down are relative to a vertical direction extending between a roof and a floor of the vehicle.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figures 1, 3:
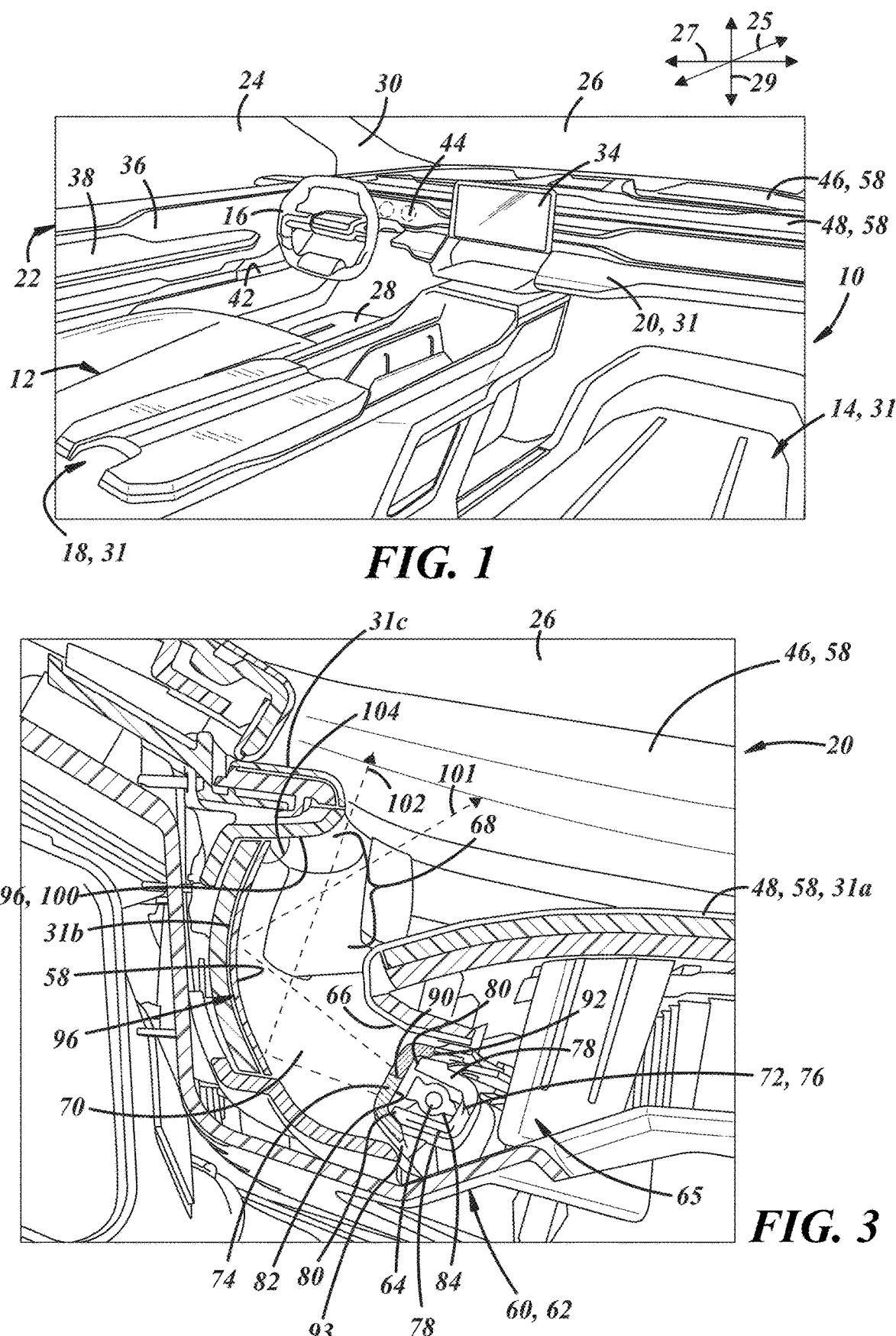
FIG. 1 is a perspective view of a portion of a vehicle passenger compartment including a lighting system.
FIG. 3 is a perspective sectional view of a portion of the instrument panel and adjacent interior trim pieces, including a lighting assembly mounted behind the show surfaces of the trim pieces.

Referring in more detail to the drawings, FIG. 1 illustrates part of a vehicle passenger compartment 10. The passenger compartment 10 is shown as including two front seats 12, 14 that are commonly referred to as a driver's seat 12 which may have a steering wheel 16 or other steering input in front of the driver seat 12, and a front passenger's seat 14 generally next to driver's seat 12. The passenger compartment 10 may include a console 18 between the seats 12, 14, and an instrument panel 20 or dashboard in front of the seats 12, 14 and generally at a forward end of the passenger compartment 10, and one or more doors 22 at and defining part of the opposite (e.g. left and right) sides of the passenger compartment 10. The doors 22 may include windows 24, and the passenger compartment 10 may further be defined by a windshield 26 at the forward end, a rear window (not shown) and the rearward end, a floor 28 at the bottom and a roof (not shown) at the top of the passenger compartment 10. In this disclosure: 1) the direction between the forward and rearward ends of the passenger compartment 10 is called the fore-aft direction and is generally indicated by arrow 25; 2) the direction between opposite sides of the vehicle, e.g. left and right sides and defined in part by one or more doors 22, is called the cross-car direction and is generally indicated by arrow 27; and 3) the direction between the floor and roof is called the vertical direction and is generally indicated by arrow 29.

To improve the appearance and comfort of the passenger compartment 10, and for other reasons, various components that define parts of the passenger compartment 10, like parts of the vehicle frame or substructure, the doors 22, roof, floor and pillars 30 (e.g. A, B and C pillars) extending to the roof, include interior trim pieces 31. The interior trim pieces 31 may include fabric layers, carpet, a headliner, seat coverings as well as interior trim pieces molded from a variety of materials and including outer surfaces exposed/viewable within the passenger compartment 10.

Figure 2:
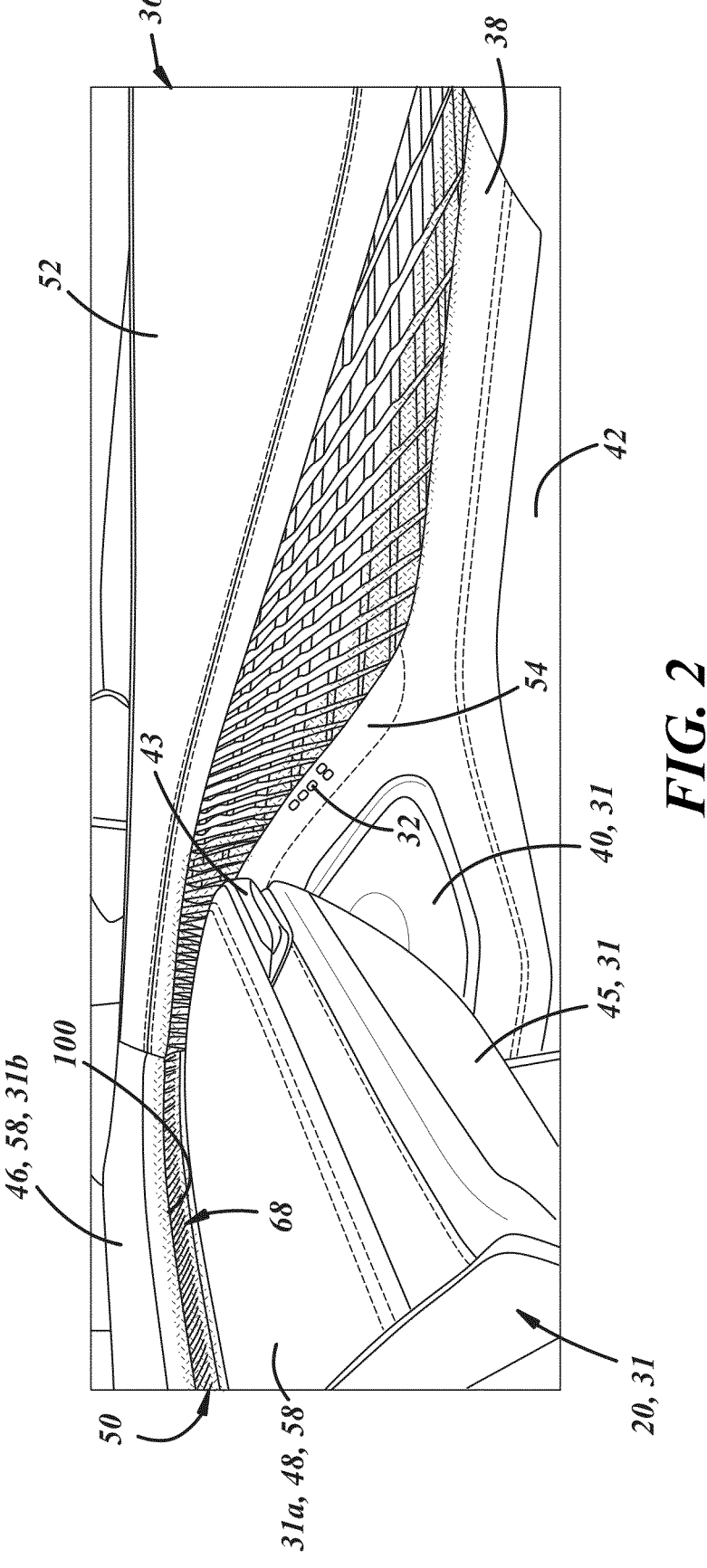
FIG. 2 is a perspective view of a portion of the passenger compartment and including part of a door and part of an instrument panel or dashboard.

In addition to covering structural components, the interior trim pieces may cover and/or mount and provide access to electronic and mechanical devices, such as switches 32 (FIG. 2), knobs, display screens 34 (FIGS. 1 and 2), door handles, gear shifters, interior lights such as overhead lights mounted at the roof, and the like. For example, as shown in FIG. 2, a door 22 may include one or more interior trim pieces such as door panel 36 that extends mostly vertically and in the fore-aft direction 25, an armrest 38 mounted to the door panel 36 and extending fore/aft and in the cross-car direction into the passenger compartment 10, and a speaker cover 40 mounted to the door panel 36. A switch 32 for opening and closing the window 24 may be provided in/on the armrest 38 or door panel 36, and a storage compartment 42 may be formed in the door panel 36 and located beneath the armrest 38.

As shown in FIGS. 1 and 2, the instrument panel 20 may extend in the cross-car direction and rearward in the fore-aft direction from the windshield 26 toward the front seats 12, 14. The instrument panel 20 may include openings or mounts for display of gauges 44 (FIG. 1), the infotainment display screen 34, HVAC vents 43 (FIG. 2) and a storage compartment 45 (FIG. 2—such as a glove box which may include a trim piece 31 or decorative cover as part thereof). In the implementation shown in FIG. 2, the instrument panel 20 includes a first portion 46 adjacent to the windshield 26 and extending in the cross-car direction and part of the way outward toward the passenger seat 14 in the fore-aft direction, and the instrument panel 20 includes a second portion 48 that extends in the fore-aft direction from the first portion 46. The second portion 48 is lower, vertically, than the first portion 46 and a transition 50 or step is defined between the portions 46, 48. The door panel 36 may also include an upper portion 52 closest to the window 24 and vertically aligned with the first portion 46 of the instrument panel 20 at a forward end of the upper portion 52, providing a continuing surface between the panels 20, 36. Similarly, a forward part 54 of the armrest 38 may be inclined vertically and generally aligned with the second portion 48 of the instrument panel 20 so that the door panel 36 generally matches the contours and shapes of the instrument panel 20. Any or all of the interior components having a surface (sometimes called a "show surfaces" 58) visible within the passenger compartment may be considered to be trim pieces 31.

For decoration and to illuminate various features and components, for example, a vehicle interior lighting system 60 (FIGS. 3 and 4) may include a portion that provides accent lighting within and radiating or reflecting from one or more interior trim pieces 31. The accent lighting may be in the form of one or more than one light assembly 62, which may include a light source 64 such as but not limited to LEDs (individual or multiple, such as LED matrices), including one or more emitters 64 that emit light in discrete areas or in continuous runs or lengths of light (e.g. light guides or tubes). Among other things, use of LEDs as a light source 64 provides an energy efficient system and allows the color (e.g. wavelength) and/or intensity or brightness (e.g. luminance) of the emitted light to be easily changed by a user and thus, permits customization of the appearance of the passenger compartment 10, as desired by a user. Of course, any light source may be used and this disclosure is not limited to LEDs or light bulbs with or without a lens or other lower energy light sources.

Figure 4:
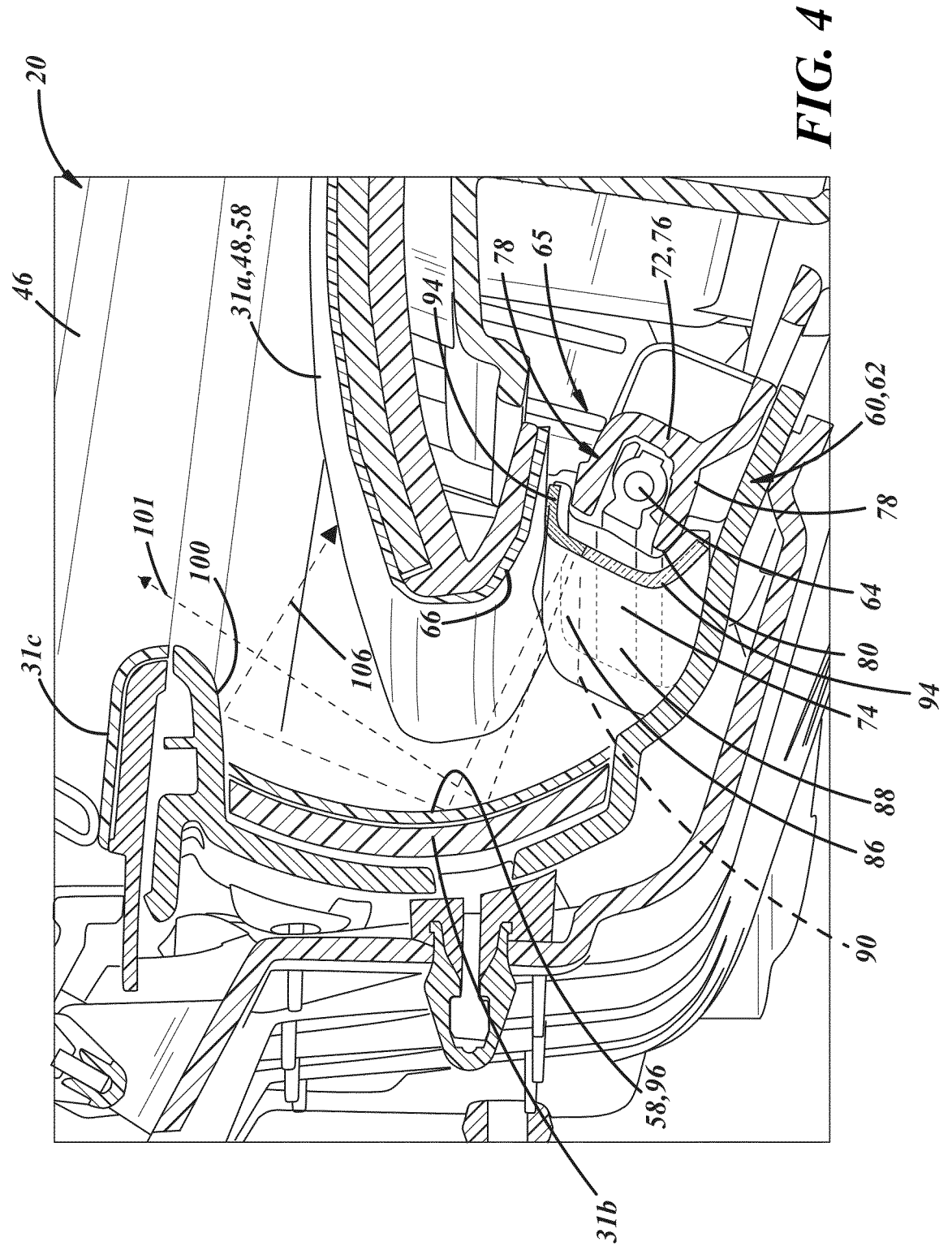
FIG. 4 is a perspective sectional view similar to and at a different angle than FIG. 3.

In at least some implementations, such as that shown in FIGS. 3 and 4, one or more lighting assemblies 62 are located in an area recessed or otherwise hidden from direct view, at least by passengers seated within the passenger compartment 10. The description that follows will be made with regard to the lighting assembly 62 shown in FIGS. 3 and 4, but other lighting assemblies may be used and multiple lighting assemblies may be used, as noted.

The lighting assembly 62 is arranged in a cavity 65 or recess between interior trim pieces 31*a* and 31*b*, and may be arranged to cause light to be directed onto the exterior or show surfaces 58 (surfaces visible within the passenger compartment 10) of one or more trim pieces 31. In at least some implementations, the cavity 65 is located behind trim piece 31*a* and spaced from and facing the show surface 58 of trim piece 31*b* and adjacent to the back or inner surface 66 of trim piece 31*a*. The cavity 65 includes an opening or outlet 68 that is open to the passenger compartment 10 and through which light may be provided through a light path 70 defined at least in part by trim pieces 31*a* and 31*b* and into the passenger compartment 10 as set forth in more detail later. The light path 70 may be curved or otherwise not straight and define an open route for light to pass through and extending between the outlet 68 to the lighting assembly 62. So arranged, the lighting assembly 62 can be hidden from direct view by passengers in the passenger compartment 10. Instead, in at least some implementations, only light from the lighting assembly 62 and passing out of the outlet 68 is seen within the passenger compartment 10.

To provide light into the passenger compartment 10, the lighting assembly 62 includes the light source 64 (e.g. an emitter) from which light is emitted, a base 72 in which the emitter 64 is carried and at least partly located, and a lens or cover 74 through which light is emitted. The base 72 is arranged between the emitter 64 and the interior cavity 65 defined by the exterior or back surfaces of the trim pieces 31, which are surfaces opposite to the show surfaces 58. The base 72 may have any desired shape and defines part of an interior of the lighting assembly 62, in which the emitter 64 is at least partially received. In at least some implementations, light need not be transmitted through the base 72 which may be opaque and made from any desired materials, including but not limited to plastics and metals. In at least some implementations, the base 72 defines a U-shaped channel having an end wall 76 and opposed sidewalls 78 extending from the end wall 76 to free ends 80 that are spaced apart.

The cover 74 that may be connected to the base 72. The cover 74 has an inner surface 82 that, with the base 72, may define an interior or enclosure 84 in which the emitter 64 is received. The cover 74 includes a first portion 86 that is formed from a first material and a second portion 88 that is formed from a second material. The first portion 86 and the second portion 88 are coupled together and form a one-piece, continuous body of the cover 74. The first portion 86 has a greater transparency than the second portion 88. In at least some implementations, the second portion 88 is opaque or nearly so, so no or very little light passes through the second portion 88. In this way, the light emitted from the lighting assembly 62 passes through the first portion 86 of the cover 74 which may be oriented and arranged to provide a desired output from the lighting assembly 62.

In at least some implementations, the first portion 86 extends from the second portion 88 at a seam 90 and to an edge 92 of the cover 74, and the second portion 88 extends from the seam 90 to a second edge 93. The cover 74 may extend the length of the base 72 and a complete enclosure may be defined between the cover 74 and base 72. In at least some implementations, light emitted from the lighting assembly 62 for display within the passenger compartment 10 comes through the first portion 86 of the cover 74. The cover 74 overlaps the free ends 80 of the sidewalls 78 and at least part of the first portion 86 is received inward, between the free ends 80 of the sidewalls 78 and overlapped with the emitter 64 that is received between the sidewalls 78. In at least some implementations, part of the second portion 88 of the cover 74 is also located between the sidewalls 78, overlapping the emitter 64 and space between the sidewalls 78.

In this context, the cover 74 may be received outboard of the free ends 80, as shown in FIGS. 3 and 4, and the portion noted as being between the sidewalls 78 refers to an area of overlap of the space between the sidewalls 78. That is, the cover 74 could be but need not be located between the free ends 80 of the sidewalls 78 and the end wall 76 of the base 72, and can instead be received over/outboard of the free ends 80 of the sidewalls 78. In the example shown, the cover 74 includes inwardly bent portions 94 at opposite sides, with the edge portions 94 received adjacent to outer surfaces of the sidewalls 78, but other arrangements may be used, as desired.

The base 72 and cover 74 may be elongated, having one dimension (e.g. length, the direction or dimension along the sidewalls 78 of the base 72) that is greater than both other dimensions (e.g. width and depth, where width is in the direction extending between the sidewalls 78 and depth is the direction extending between the cover 74 and end wall 76). In this way, the lighting assembly 62 can be provided along a length of one or more trim pieces 31 and provide more uniform lighting across longer areas of the passenger compartment 10. For example, along the cross-car dimension 27 of the instrument panel/dashboard 20 of a vehicle. Less width and depth provides a smaller cross-sectional area (taken perpendicular to the length, as shown in FIG. 3) and enables the lighting assembly 62 to be more easily concealed (e.g. can be concealed in a smaller cavity 65) and avoid consuming unnecessary space within the vehicle.

The cover 74 may be molded from suitable polymeric materials, such as by injection molding. The first portion 86 or second portion 88 may be molded first by injecting into a mold the corresponding material, and then the other of the first portion 86 or second portion 88 may be formed by later injecting into the mold the corresponding material for that portion. The first and second portions 86, 88 may bond together at an interface (e.g. the seam 90) between the portions, under the heat and/or pressure used in the molding process. This may provide an integrally formed cover 74 having different materials for the first portion 86 and the second portion 88, as described herein. That is, the cover 74 including both the first and second portions 86, 88 may be a single component when removed from the mold, and the portions need not be connected together by a separate assembly operation after they are molded and without additional connection features needed, such as screws, clips, adhesive, welding, heat staking or the like.

The first portion 86 and second portion 88 may be connected or bonded together along the seam 90 that extends along the length of the cover 74 and that overlaps the emitter 64. In this arrangement, some light emitted from the emitter 64 is incident upon at least part of the second portion 88, the seam 90 and at least part of the first portion 86 of the cover 74. Further, by changing the mold, the size and shape of the cover 74, including the first portion 86 or second portion 88, can be changed to provide a different cover 74 having different light transparency characteristics. In this way, different covers 74 may be used with common base 72 and lighting assembly 62 components to provide a range of products having different light output characteristics while sharing most of the same components.

In at least some examples the first portion 86 of the cover 74 may be formed from polymeric materials such as, but not limited to, polycarbonate, acrylic or PC-ABS. The first portion 86 may have a transparency such that 50% up to 100% of the light emitted (which may be characterized in candela per square meter, or lumens per square inch, for example) from the emitter passes through the first portion 86. In at least some examples the second portion 88 of the cover 74 may be formed from polymeric materials such as, but not limited to, polycarbonate, acrylic or PC-ABS. The second portion 88 may be opaque and not let light emitted by the emitter 64 to pass therethrough, or it may have a relative low transparency compared to the first portion 86, such as a reduction of light emitted by 75% or more.

The show surface 58 of one or more trim pieces 31 may be located within a direct path of light emitted through the first portion 86 of the cover 74, or one or more reflectors 96 may be arranged between the lighting assembly 62 and the show surface 58 of one or more trim pieces 31 (e.g. trim piece 31a as set forth in more detail below). Further, in at least some implementations, the reflector 96 may be defined by a trim piece, including but not limited to a show surface 58 of a trim piece 31. In the example shown in FIGS. 3 and 4, the show surface 58 of trim piece 31b is directly illuminated by the light assembly 62, and light emitted onto the trim piece 31b is reflected into the passenger compartment through the outlet 68 and, in at least some implementations, away from the windshield 26 or a window 24. This light is represented in FIG. 3 by dashed line arrow 101. As shown by dashed arrow 102, in this example, if light were emitted onto the show surface 58 of trim piece 31b through the second portion 88 of the cover 74, that light would be directed toward and onto the windshield 26 and not sufficiently away from the windshield 26. Thus, reducing or eliminating light emission through the second portion of the cover 74 reduces the light reflected onto the windshield (in this example).

In the example shown, the show surface 58 of trim piece 31b faces outwardly, and defines part of the light path 70 between the lighting assembly 62 and the outlet 68. And the trim piece 31a is arranged overlapping the cover 74, with at least part of the cover 74 below the overlapping part of the trim piece 31a in the vertical direction, and behind the trim piece 31a in one or both of the fore-aft direction and cross-car direction.

As also shown in FIGS. 3 and 4, a third trim piece 31c may define part of the light path 70 including part of the outlet 68, and may be arranged adjacent to the second trim piece 31*b*. In this example, the third trim piece 31*c* defines a reflecting surface 100 downstream from the show surface 58 of the trim piece 31*b* (i.e. light hits the show surface 58 of trim piece 31*b* before the reflecting surface 100). Light that is directed by the trim piece 31*b* onto the reflecting surface 100 may then be directed onto the show surface(s) 58 of the trim pieces like trim piece 31*a*. In at least some implementations, a first surface, shown as the show surface 58 of trim piece 31*b*, is oriented to direct light from the lighting assembly 62 toward the outlet 68, and a second surface, shown as the reflecting surface 100, is oriented to direct light out of the outlet 68 in a desired direction. In at least some implementations, the second surface is not parallel to and is at a non-zero angle to the first surface. At least part of the second surface may be at an included angle 104 of between 45 and 135 degrees relative to at least part of the first surface. In at least some implementations, some light is directed out of the outlet 68 by the second surface in a direction such that the light is directed away from the windshield or windows, and the light may be directed onto show surface(s) 58 of adjacent trim pieces 31*a* and not generally out into the passenger compartment 10. This reflected light is shown by the dashed line arrow 106 in FIG. 4. Further, the light assembly 62 may be overlapped by an inner surface 66 of a trim piece 31*a*, where the inner surface 108 does not define a show surface 58. The inner surface 66 may block at least some light emitted from the first portion 86 of the cover 74 and further constrain the emitted light to travel in a desired direction within the path 70.

Accordingly, in at least some implementations, no or less light is directed at the windshield 26, windows 24 and other surfaces on which the light may provide undesired reflections or on which light spill from the lighting assembly 62 is not desired. For example, passengers look through windows 24 and the windshield 26 and light reflections on those surfaces can be undesirable. In at least some implementations, the second surface 100 is arranged to direct light downwardly onto show surface(s) 58 of one or more trim pieces 31 (e.g. trim piece 31*a*). Here, downwardly is used with reference to the vertical direction 29 generally from the roof of the vehicle toward a floor of the vehicle. In this way, less light is directed upwardly into the passenger compartment 10 so less light is reflected onto the glass/window surfaces 24, 26 of the vehicle.

As shown in FIGS. 3 and 4, in at least some implementations, the light path 70 and outlet 68 may be large enough to permit light to pass out of the outlet 68 and generally toward the windshield 26. A representative path for such light is shown by the dashed line 102 in FIG. 3. To prevent this, the portion of the lighting assembly 62 that would emit light along that path 102 is covered by the second portion 88 of the cover 74 through which little or no light passes. In other words, the second portion 88 of the cover 74 is arranged to prevent light along an undesired path 102 from being emitted from the lighting assembly 62. In this way, the lighting assembly 62 can be arranged so that light emitted from the lighting assembly 62 follows a desired path (e.g. paths 101 or 106) and is reflected in a desired manner into the passenger compartment 10. This can greatly reduce unwanted reflections of light in the passenger compartment 10, such as on windows or the windshield, while providing desired lighting of show surfaces 58 within the vehicle, in a controlled manner.

Further, different covers 74 may be used with the same emitter 64 and base 72 to enable different output light characteristics, such as light direction, amount, intensity/brightness and the like, to be achieved by the lighting assembly 62 having a different cover. In this way, many common components can be used with different light assemblies to provide desired lighting effects. For example, some interior trim pieces 31 have different reflectivity. So in the same model of a vehicle, different light intensities/brightness or the like might be desired in different vehicles having different show surface characteristics. Different covers may also enable use of common components for light assemblies in different vehicles as well.

What is claimed is:

1. An interior lighting assembly for a vehicle, comprising:
a first trim piece having an exterior surface that defines part of a cavity and part of a light path;
a second trim piece spaced from the first trim piece and having an exterior surface that defines part of the light path, where the light path has an outlet arranged to be open to a passenger compartment of the vehicle;
a base received in the cavity spaced from the outlet and behind at least part of the first trim piece, the base having an end wall and an open side opposite to the end wall;
a light emitter between the end wall and the open side; and
a cover attached to the base over the open side and defining with the base an interior in which the emitter is received, the cover is located behind at least part of the first trim piece and has a first portion formed of a first material and a second portion formed of a second material so that the second portion has a lesser transparency than the first portion.

2. The assembly of claim 1 wherein the second portion is opaque and light from the emitter is emitted from the assembly only through the first portion.

3. The assembly of claim 1 wherein the first portion is bonded to the second portion along a seam that overlaps the light emitter so that light is emitted by the emitter onto at least part of the second portion, the seam and at least part of the first portion.

4. The assembly of claim 1 wherein one of the first portion and the second portion is molded onto the other of the first portion and the second portion so that the first portion and second portion are integrally connected together.

5. The assembly of claim 1 wherein the emitter is or is part of a LED light tube.

6. The assembly of claim 1 which also includes a reflector spaced from the cover and arranged to reflect light emitted from the emitter and through the first portion of the cover.

7. The assembly of claim 6 wherein the reflector includes a first surface and a second surface at a different angle than the first surface, and wherein the first surface is located between the emitter and the second surface in a light path.

8. The assembly of claim 7 wherein an included angle between the first surface and the second surface is between 45 degrees and 135 degrees.

9. A vehicle, comprising:
a first trim piece having an exterior surface that defines a first trim piece show surface defining part of a cavity that defines at least part of a light path;
a second trim piece spaced from the first trim piece and including a second trim piece show surface that defines part of the light path;
a lighting assembly received within the cavity and overlapped by a surface of the first trim piece that is not the first trim piece show surface and that defines part of the cavity, the lighting assembly having a base, a cover and an emitter that is received between the base and the cover, the cover has a first portion formed of a first material and a second portion formed of a second material so that the second portion has a lesser transparency than the first portion, and wherein the second trim piece show surface is arranged to direct light emitted from the emitter and through the first portion of the cover out of the light path, wherein the second trim piece show surface is arranged to direct light away from a glass surface of the vehicle.

10. The vehicle of claim 9, wherein the second portion of the cover blocks light emitted by the emitter that would be reflected by the second trim piece show surface toward the glass surface.

11. The vehicle of 9 which also includes a reflecting surface that is not parallel to the second trim piece show surface, the reflecting surface is downstream of the second trim piece show surface and arranged to reflect light onto the first trim piece show surface.

12. The vehicle of claim 11 wherein the reflecting surface is arranged at a height above the second trim piece show surface and the reflecting surface is arranged to reflect light down onto the first trim piece show surface, where above and down are relative to a vertical direction extending between a roof and a floor of the vehicle.

13. The vehicle of claim 11 wherein the second reflecting surface is arranged at an included angle of between 45 degrees and 135 degrees relative to at least part of a first reflecting surface.

14. The vehicle of 11 wherein the reflecting surface is arranged so that at least some of the light from the emitter reflects off of the second trim piece show surface and then onto the reflecting surface, and at least some of the light on the reflecting surface is reflected onto the first trim piece show surface.

15. The vehicle of claim 11 wherein the reflecting surface defines part of an outlet of the light path.

16. The vehicle of claim 15 wherein the outlet is defined in part by the first trim piece show surface.

17. The vehicle of claim 9 wherein the second portion is opaque and light from the emitter is emitted from the lighting assembly through the first portion but not the second portion.

18. The vehicle of claim 9 wherein the first portion is bonded to the second portion along a seam that overlaps the light emitter so that light is emitted by the emitter onto at least part of the second portion, the seam and at least part of the first portion.

19. The vehicle of claim 9 wherein one of the first portion and the second portion is molded onto the other of the first portion and the second portion.

20. The vehicle of claim 9 wherein the emitter includes a LED.

* * * * *